A. SACKS.
TIRE CASING.
APPLICATION FILED AUG. 5, 1919.
1,365,280. Patented Jan. 11, 1921.
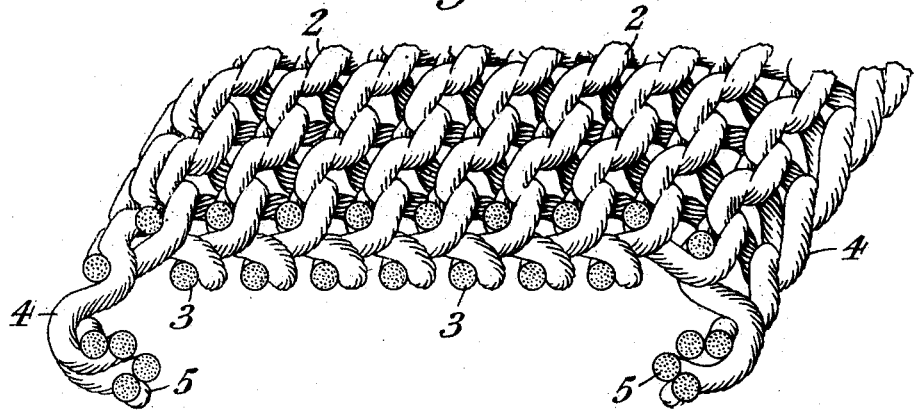
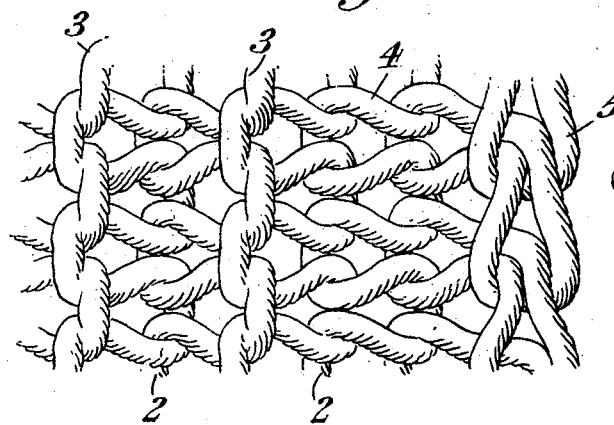
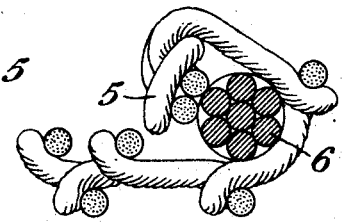
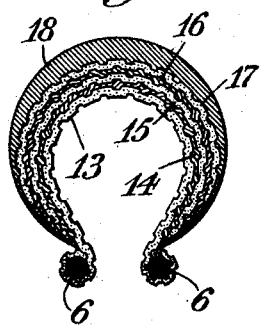
Inventor:
Abraham Sacks
By William M. Stone,
his Attorney.

UNITED STATES PATENT OFFICE.

ABRAHAM SACKS, OF BROOKLYN, NEW YORK.

TIRE-CASING.

1,365,280. Specification of Letters Patent. Patented Jan. 11, 1921.

Application filed August 5, 1919. Serial No. 315,370.

*To all whom it may concern:*

Be it known that I, ABRAHAM SACKS, a citizen of the United States, and a resident of New York, borough of Brooklyn, in the county of Kings and State of New York, have invented certain new and useful Improvements in Tire-Casings, of which the following is a specification.

This invention relates to tire casings, particularly such as are used on motor vehicles, and within which are inserted an inflated annular tube to hold the tire casing in serviceable position. My improvements relate particularly to the fabric portions of such a casing and to the construction of the casing, including such fabric portions. The object of my improvements is to provide a tire casing of greater strength and of greater elasticity and therefore of greater wearing quality than those heretofore made. A further object of my improvements is to provide a tire having the foregoing desirable features at a less cost than heretofore required for high grade tires. The so-called cord tires have been esteemed as most serviceable and such tires have heretofore been laid up in a laborious manner, and even then such tires had a limit of elasticity governed by the ultimate endwise stretch of the cord. It has also been proposed to braid or weave the cords into a fabric but neither of these methods materially increases the elasticity of the casing beyond the endwise elasticity of the individual cord.

By my improvements the cord is knitted into a fabric having an inherent elasticity in all directions greatly beyond the lengthwise elasticity of the individual cords of which the fabric is formed. My improved tire casing and fabric therefore is illustrated in its preferred embodiment in the drawing accompanying this specification wherein:—

Figure 1 is a perspective view of a portion of my improved fabric, one end thereof being shown in cross-section. Fig. 2 is a plan view of an edge portion of a part of what is shown in Fig. 1 but with the fabric stretched transversely to show its construction and elasticity. Fig. 3 is a fragmentary cross-sectional view of an edge portion of said fabric wrapped about a flexible wire cable to form the bead ring. Fig. 4 is a cross-section of a tire casing including said knitted fabric.

The scale of Fig. 1 is greatly exaggerated over natural size in detail but the fabric is shown of much narrower width than would be required in practice. Figs. 2 and 3 are to the same scale as Fig. 1. Fig. 4 is to a scale much smaller than that of Fig. 1.

Referring particularly to Fig. 1, my improved fabric comprises a circumferentially endless knitted web preferably having alternate stitches as 2, 2 thereof raised as shown in light shading, and intermediate stitches 3, 3 depressed as shown in dark shading, whereby parallel outwardly extending ribs and alternate inwardly extending ribs are formed in the fabric. Preferably and particularly for that fabric member which forms the inner member of the tire casing, Fig. 4, I provide only the mid-portion of the fabric with definitely protuberant ribs as described and knit the opposite edge portions 4, 4 thinner and substantially flat, so that those edge portions may be conveniently folded about a flexible wire cable 6. I also preferably provide said edge portions 4, 4 with terminal ribs 5, 5 thereby strengthening the extreme edges of the fabric.

In Fig. 2, the great stretchability of my improved fabric is shown and its elasticity is such that when released, after stretching, it immediately regains its normal close texture as shown in Fig. 1. Due to the peculiarities of the construction of the knitted fabric, said fabric is equally stretchable and elastic in all directions. This stretchability and elasticity is so great that it is substantially equal to that of the rubber commonly employed in tire casings, and when one or more of said fabric members are assembled with layers of rubber therebetween, respectively, to form a casing, the casing as a whole has the qualities of stretchability and elasticity beyond that of any casing previously known to me. These features greatly enhance not only the life of the casing but add greatly to its resilience and therefore to the easy riding qualities of the vehicle which it supports.

In Fig. 4, the tire casing is shown as comprising an inner member 13, formed of my improved knitted fabric of Fig. 1, a second knitted fabric member 15, similar to that of member 13 except that in member 15 the thin flat edges 4 are omitted. These fabric members are separated by a layer of rubber 14. The casing may be built up to a further thickness by the addition of one or more rubber members as 16, 18 and fabric members as 17.

I claim:

1. In a tire casing, an inner member formed of a circumferentially endless knitted fabric, the cross-wise mid-portion of which is ribbed circumferentially of the tire and the opposite circumferential edge portions of which are relatively thin and flat.

2. In a tire casing, an inner member formed of a circumferentially endless knitted fabric, the cross-wise mid-portion of which is ribbed circumferentially of the tire and the opposite circumferential edge portions of which are relatively thin and flat, said edge portions terminating in circumferential ribs respectively.

In witness whereof, I hereby affix my signature this 21 day of July, 1919.

ABRAHAM SACKS.